(12) United States Patent
Mukai et al.

(10) Patent No.: US 9,319,294 B2
(45) Date of Patent: Apr. 19, 2016

(54) WAKE-UP PROCESSING BY NETWORK APPARATUS IN RESPONSE TO REMOTELY-TRANSMITTED WAKE-UP INSTRUCTION

(71) Applicant: Seiko Epson Corporation, Tokyo (JP)

(72) Inventors: Yuji Mukai, Nagano-ken (JP); Hikaru Kumagai, Nagano-ken (JP); Kyoichi Kamijima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 13/777,635

(22) Filed: Feb. 26, 2013

(65) Prior Publication Data

US 2013/0232257 A1 Sep. 5, 2013

(30) Foreign Application Priority Data

Mar. 1, 2012 (JP) ................................. 2012-044904

(51) Int. Cl.
*G06F 3/12* (2006.01)
*H04L 12/26* (2006.01)
*H04L 12/12* (2006.01)

(52) U.S. Cl.
CPC ................ *H04L 43/10* (2013.01); *H04L 12/12* (2013.01); *Y02B 60/34* (2013.01)

(58) Field of Classification Search
None
See application file for complete search history.

(56) References Cited

U.S. PATENT DOCUMENTS

| | | | |
|---|---|---|---|
| 2004/0139385 A1 | 7/2004 | Sakaue | |
| 2006/0087675 A1* | 4/2006 | Terada et al. | 358/1.14 |
| 2006/0200704 A1 | 9/2006 | Takahashi et al. | |
| 2008/0080500 A1* | 4/2008 | Shimura et al. | 370/389 |
| 2008/0183880 A1* | 7/2008 | Sasage et al. | 709/229 |
| 2009/0228695 A1* | 9/2009 | Pathak | 713/1 |
| 2010/0188698 A1* | 7/2010 | Koizumi | 358/1.15 |
| 2010/0210240 A1* | 8/2010 | Mahaffey et al. | 455/411 |
| 2011/0087903 A1* | 4/2011 | MacDougall et al. | 713/310 |
| 2011/0317200 A1* | 12/2011 | Honda et al. | 358/1.14 |
| 2012/0102088 A1* | 4/2012 | Bindal et al. | 709/203 |

FOREIGN PATENT DOCUMENTS

| | | | |
|---|---|---|---|
| JP | 2004-166257 A | | 6/2004 |
| JP | 2006-172186 A | | 6/2006 |
| JP | 2007-149106 A | | 6/2007 |
| JP | 2007-293729 A | | 11/2007 |
| JP | 2008-155375 A | | 7/2008 |
| JP | 2008-250544 A | | 10/2008 |
| JP | 2010-176671 A | | 8/2010 |
| JP | 2010-217983 A | | 9/2010 |
| JP | 2012-006389 A | | 1/2012 |
| JP | 2012023570 A | * | 2/2012 |

* cited by examiner

*Primary Examiner* — Vincent Rudolph
*Assistant Examiner* — Richa Mishra

(57) ABSTRACT

Provided is a network apparatus that has a function of receiving a wake-up instruction from a terminal apparatus over a network and thereby waking up, including a wake-up instruction receiving unit that receives the wake-up instruction, a wake-up control unit that performs wake-up processing in a case of receiving the wake-up instruction, and a state transmitting unit that transmits a state notification of the wake-up processing to the terminal apparatus in the case of receiving the wake-up instruction.

17 Claims, 7 Drawing Sheets

WAKE-UP PROCESSING BY NETWORK APPARATUS IN RESPONSE TO REMOTELY-TRANSMITTED WAKE-UP INSTRUCTION

CROSS REFERENCES TO RELATED APPLICATIONS

This application claims priority to Japanese Application No. 2012-044904, filed Mar. 1, 2012, the entirety of which is incorporated by reference herein.

BACKGROUND

1. Technical Field

The present invention relates to a network system, a network apparatus, and a computer-readable storage medium.

2. Related Art

A technology that wakes up a network apparatus by remotely control over a network, for example, Wake-on-LAN (WOL) is known. The network apparatus corresponding to WOL is equipped, for example, with a network adaptor that is capable of interpreting a predetermined packet directing wake-up called a magic packet. Then, the network apparatus wakes up in a case where the network adaptor detects the reception of the predetermined packet.

With regard to this, an image forming system is disclosed in JP-A-2010-217983, in which a terminal apparatus transmits a return instruction signal to an image forming apparatus, switches to an image-formable state by the image forming apparatus receiving the return instruction signal, and transmits state information indicating the image-formable state to the terminal apparatus.

However, the terminal apparatus disclosed in JP-A-2010-217983 is not capable of being aware of a state of the image forming apparatus until the state information indicating the image-formable state is received. For this reason, the following problem occurs that causes a user a concern.

For example, in a case where the image forming apparatus is not capable of completing wake-up processing for whatever reason, the state information indicating the image-formable state is not transmitted from the image forming apparatus. Then, the terminal apparatus is not capable of determining whether or not the wake-up processing is performed. Even though a predetermined time out period is set, the terminal apparatus is not capable of determining whether or not the wake-up processing is performed, until the time out period expires. Furthermore, for example, in a case where for some reason the wake-up processing time is extended until the image forming apparatus switches to the image-formable state, the terminal apparatus is not capable of determining whether or not the wake-up processing is performed until the state information indicating the image-formable state is received.

Furthermore, in JP-A-2010-217983, a limitation is not imposed on the terminal apparatus that is capable of transmitting the return instruction signal. For this reason, the user's need for preventing the terminal apparatuses other than the specific terminal apparatus from transmitting the return instructions may not be met.

SUMMARY

An advantage of some aspects of the invention is that even before completing a wake-up of a network apparatus, a terminal wake-up apparatus is made to determine that state.

Another advantage of some aspects of the invention is that the convenience of a remote wake-up of a network apparatus is improved.

The invention can be realized in the following forms or application examples.

According to a first aspect of the invention, there is provided a network system that includes a terminal apparatus and a network apparatus which has a function of receiving a wake-up instruction from the terminal apparatus over a network and thereby waking up, and in which the network apparatus includes, a wake-up instruction receiving unit that receives the wake-up instruction, a wake-up control unit that performs wake-up processing in a case of receiving the wake-up instruction, and a state transmitting unit that transmits a state notification of the wake-up processing to the terminal apparatus until the wake-up processing is completed, in the case of receiving the wake-up direction and wherein the terminal apparatus includes a wake-up instruction transmitting unit that transmits the wake-up instruction, a state receiving unit that receives the state notification of the wake-up processing, and a state display unit that displays a state of the wake-up processing in a case of receiving the state notification of the wake-up processing.

In the network system, even before the wake-up of the network apparatus is completed, the terminal apparatus may determine a state of the network terminal apparatus.

In the network system, the state transmitting unit may transmit a wake-up completion notification to the terminal apparatus in a case where the wake-up processing is completed, and the state receiving unit may receive the wake-up completion notification, and the state display unit may display a state of the wake-up processing until the wake-up completion notification is received.

In the network system, the terminal apparatus may determine a state of the network terminal apparatus, until the wake-up of the network apparatus is completed.

In the network system, the state notification of the wake-up processing may include information indicating starting of the wake-up processing, and the state display unit may display information indicating that the wake-up processing is started.

In the network system, the terminal apparatus may determine whether the wake-up processing is started, and may notify a user that the wake-up processing is started.

In the network system, the state notification of the wake-up processing may include estimated necessary time for the wake-up processing, and the state display unit may display a state of progress in the wake-up processing based on the estimated necessary time.

In the network system, the terminal apparatus may determine the state of progress in the wake-up processing and may notify the user of the state of progress in the wake-up processing.

In the network system, the state transmitting unit may compute a predetermined value as the estimated necessary time, or may compute the estimated necessary time based on a predetermined formula.

In the network system, when a fixed estimated wake-up time is transmitted, the estimated wake-up time may be provided at a higher speed of response. In the network system, when the estimated wake-up time is computed, the estimated wake-up time may be provided that has higher accuracy than when it depends on the state of the printing apparatus.

In the network system, the wake-up instruction transmitting unit may transmit a wake-up instruction designating a function of a wake-up targeted object, the wake-up control unit may perform the wake-up processing on the function designated with the wake-up instruction, and the state transmitting unit may transmit the state notification of the wake-up processing on the function designated with the wake-up instruction.

In the network system, the user may be notified of the more accurate state of progress according to the function that has to wake up.

In the network system, the two or more terminal apparatuses may be provided, and the state transmitting unit may transmit the state notification of the wake-up processing to the terminal apparatus that is a transmitting source of a different wake-up instruction in a case where the different wake-up instruction is additionally received during a period of time from the starting of the wake-up processing to the ending of the wake-up processing.

In the network system, the different terminal apparatus may determine that the wake-up processing has already been started, and may notify a user that the wake-up processing is started.

In the network system, the network apparatus may include an authorization determination unit that determines whether or not the terminal apparatus that is the transmitting source of the wake-up instruction has an authorization to wake up the network apparatus, the wake-up control unit may not perform the wake-up processing in a case where it is determined that the terminal apparatus does not have the authorization, and the state transmitting unit may transmit a notification that wake-up is impossible, as the state notification of the wake-up processing, to the terminal apparatus, in a case where it is determined that the terminal apparatus does not have the authorization, and the state display unit may display the notification that the wake-up is impossible.

In the network system, the network apparatus may impose a limitation on the wake-up caused by an unauthorized user in the network apparatus, and the terminal apparatus may notify the user that the wake-up is impossible.

According to a second aspect of the invention, there is provided a method of controlling wake-up in a network system that includes a terminal apparatus and a network apparatus which has a function of receiving a wake-up instruction from the terminal apparatus over a network and thereby waking up, the method including causing the terminal apparatus to transmit the wake-up instruction, causing the network apparatus to receive the wake-up instruction, causing the network apparatus to perform wake-up processing in a case of receiving the wake-up instruction, causing the network apparatus to transmit a state notification of the wake-up processing to the terminal apparatus until the wake-up processing is completed, in the case of receiving the wake-up instruction, causing the terminal apparatus to receive the state notification of the wake-up processing, and causing the terminal apparatus to display the state of the wake-up processing in a case of receiving the state notification of the wake-up processing.

In the method, even before the wake-up of the network apparatus is completed, the terminal apparatus may determine a state of the network terminal apparatus.

According to a third aspect of the invention, there is provided a network apparatus that has a function of receiving a wake-up instruction from a terminal apparatus over a network and thereby waking up, including a wake-up instruction receiving unit that receives the wake-up instruction, a wake-up control unit that performs wake-up processing in a case of receiving the wake-up instruction, and a state transmitting unit that transmits a state notification of the wake-up processing to the terminal apparatus in the case of receiving the wake-up instruction.

In the network apparatus, even before the wake-up of the network apparatus is completed, the terminal apparatus may determine a state of the network terminal apparatus.

The network apparatus may further include a network interface, a CPU that is a main control unit of the network apparatus, and a microcomputer or a sub CPU that performs a specific processing relating to a response to the wake-up instruction, and in the network apparatus, the network interface may include the wake-up instruction receiving unit, the CPU may include the wake-up control unit, and the microcomputer or the sub CPU may include the state transmitting unit, and transmit the state notification of the wake-up processing before starting the wake-up processing.

In the network apparatus, since the CPU does not need to be started in a case where the wake-up instruction is received, the time it takes to respond with the state information may be shortened.

According to a fourth aspect of the invention, there is provided a program that causes a computer to function as a terminal apparatus which transmits a wake-up instruction to a network apparatus which has a function of receiving the wake-up instruction over a network and thereby waking up, the terminal apparatus including as a wake-up instruction transmitting unit that transmits the wake-up instruction to the network apparatus, as a state receiving unit that receives the state notification of the wake-up processing from the network apparatus, and as a state display unit that displays a state of the wake-up processing in a case of receiving the state notification of the wake-up processing.

In the program, even before the wake-up of the network apparatus is completed, the terminal apparatus may determine a state of the network terminal apparatus.

Aspects, configurations, and effects other than those described above are made clear by the following descriptions of embodiments.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
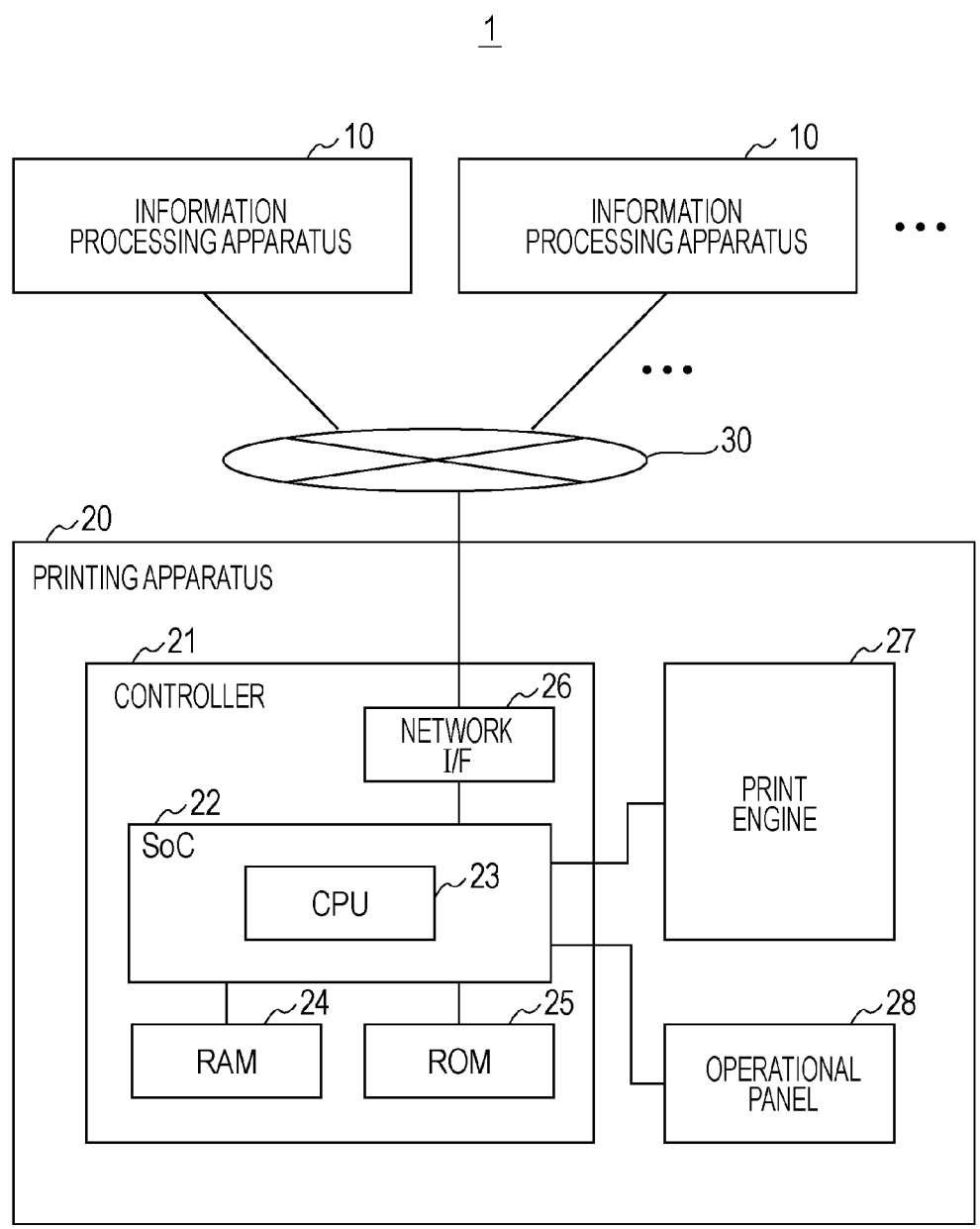
FIG. 1 is a view illustrating one example of an outlined configuration of a printing system according to a first embodiment of the invention.

One example of a first embodiment of the invention is described below referring to the drawings.

According to the present embodiment, a printing apparatus such as a printer and a multi-function printer is enumerated as an example to describe a network apparatus with a remote wake-up function, and an information processing apparatus such as a PC as an example to describe a terminal apparatus. In addition, for example, WOL may be used as a remote wake-up standard, but the remote wake-up start standard is not limited to WOL.

FIG. 1 is a view illustrating one example of an outlined configuration of a printing system according to one embodiment of the invention.

A printing system 1 includes an information processing apparatus 10 and a printing apparatus 20. The information processing apparatus 10 and the printing apparatus 20 are connected to each other via a LAN 30 (Local Area Network) and communication may take place between them.

The information processing apparatus 10 functions as a host computer of the printing apparatus 20. The information processing apparatus 10, for example, is a computer that includes a CPU, a RAM, a ROM, an auxiliary memory device, a network I/F, a display, and an input device such as a mouse and a keyboard.

For example, an OS (Operating System), an application program, a printer driver program and the like are installed in the information processing apparatus 10. The printer driver, for example, generates print data based on print-targeted data that is generated with the application and on a print setting designated, and transmits the generated print data to the printing apparatus 20.

The printing apparatus 20, for example, is an ink jet printer or an electrophotography printer.

The printing apparatus 20 operates in a normal mode and a power-saving mode. The printing apparatus 20 switches between these operation modes and performs restoration to the previous mode. According to the present embodiment, the power-saving mode, for example, is a mode in which devices other than the device or part of the device necessary to perform monitoring of a predetermined packet dictating wake-up are turned off. Of course, a printer 20 may have one or more different modes (for example, a power-saving mode that is lower in power consumption than the normal mode and is higher in power consumption than the power-saving mode).

The printing apparatus 20 includes a controller 21, a print engine 27, and an operational panel 28. The controller 21 includes a SoC (System on Chip) 22, a RAM 24, a ROM 25, and a network interface (I/F) 26.

The SoC 22 is a main control unit that performs processing on control of the entire printing apparatus 20, and includes a COU 23 and various interface control circuits.

The RAM 24 is a volatile storage device in which to store data and the like that are used in running various programs and performing various processing. The ROM 25 is a non-volatile storage device in which to store data and the like that are used in running various programs and performing various processing.

The network I/F 26 is a network adaptor that corresponds to the wake-up (for example, WOL), and controls network communication. The network I/F 26 monitors the reception of the predetermined packet dictating the wake-up. In a case of detecting the reception of the packet, the network I/F 26 generates an interrupt signal, and outputs the generated interrupt signal to the SoC 22. The interrupt signal triggers the SoC 22 to cause the printing apparatus 20 to return from the power-saving mode back to the normal mode.

The print engine 27 prints the printing data output from the controller 21 out on a print medium, based on an instruction from the controller 21. The print engine 27 may employ, for example, the ink jet type or electrophotography type, as a print type.

The operational panel 28 functions as an interface between a user and the printing apparatus 20. The operational panel 28, for example, includes the display that displays an image and the like, and the input device that receives input of the operation by the user, such as a touch panel and a button.

The above is one example of the outlined configuration of the printing system 1. However, the configuration described above is for describing the main configuration in describing the characteristics of the invention, and thus does not impose any limitation on the invention. Furthermore, configurations, employed by a general-purpose printing system, a general-purpose information processing apparatus, and a general-purpose printing apparatus, are not excluded.

Next, an outline of processing that is realized in the printing system 1 described above is described.

Figure 2:
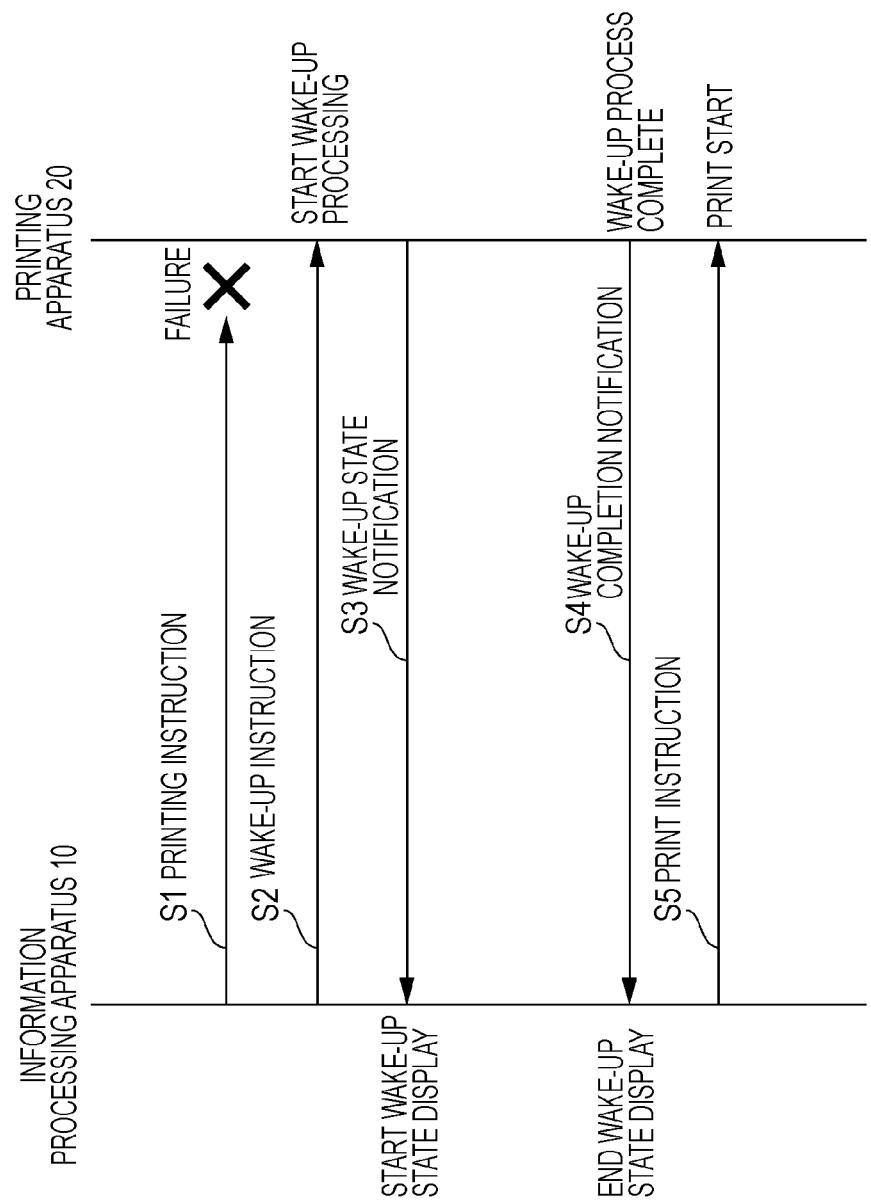
FIG. 2 is a view illustrating one example of an outline of a sequence for performing a wake-up on a printing apparatus in the printing system.

FIG. 2 is a view illustrating one example of an outline of a sequence for performing the wake-up on the printing apparatus in the printing system. In addition, at the time of initiating this sequence, the printing apparatus 20 is in the power-saving mode.

The information processing apparatus 10 transmits a print instruction to the printing apparatus 20, and transmits a wake-up instruction to the printing apparatus 20 (S2) when a failure occurs in performing the printing (S1). For example, the wake-up instruction is performed by broadcasting a magic packet. When receiving the wake-up instruction, the printing apparatus 20 is switched from the power-saving mode to the normal mode, that is, starts wake-up processing.

When the wake-up processing is initiated, the printing apparatus 20 transmit a wake-up state notification, which includes information indicating that the wake-up processing is initiated and estimated wake-up time relating to the wake-up processing, to the information processing apparatus 10 (S3). Of course, S3 may be performed immediately before the wake-up processing is initiated. When the receiving the wake-up state notification, the information processing apparatus 10 starts displaying of a wake-up state. For example, the information processing apparatus 10 displays the information that the wake-up processing is initiated and the estimated wake-up time, in order for the user to view the notification.

When the wake-up processing is completed, the printing apparatus 20 transmits a wake-up completion notification that the wake-up processing is completed, to the information processing apparatus 10 (S4). When receiving the wake-up completion notification, the information processing apparatus 10 terminates the displaying of the wake-up state, and retransmits the print instruction that met with failure in S1, to the printing apparatus 20 (S5).

Next, a configuration is described in detail in which the processing on the printing system 1 described above is realized.

Figure 3:
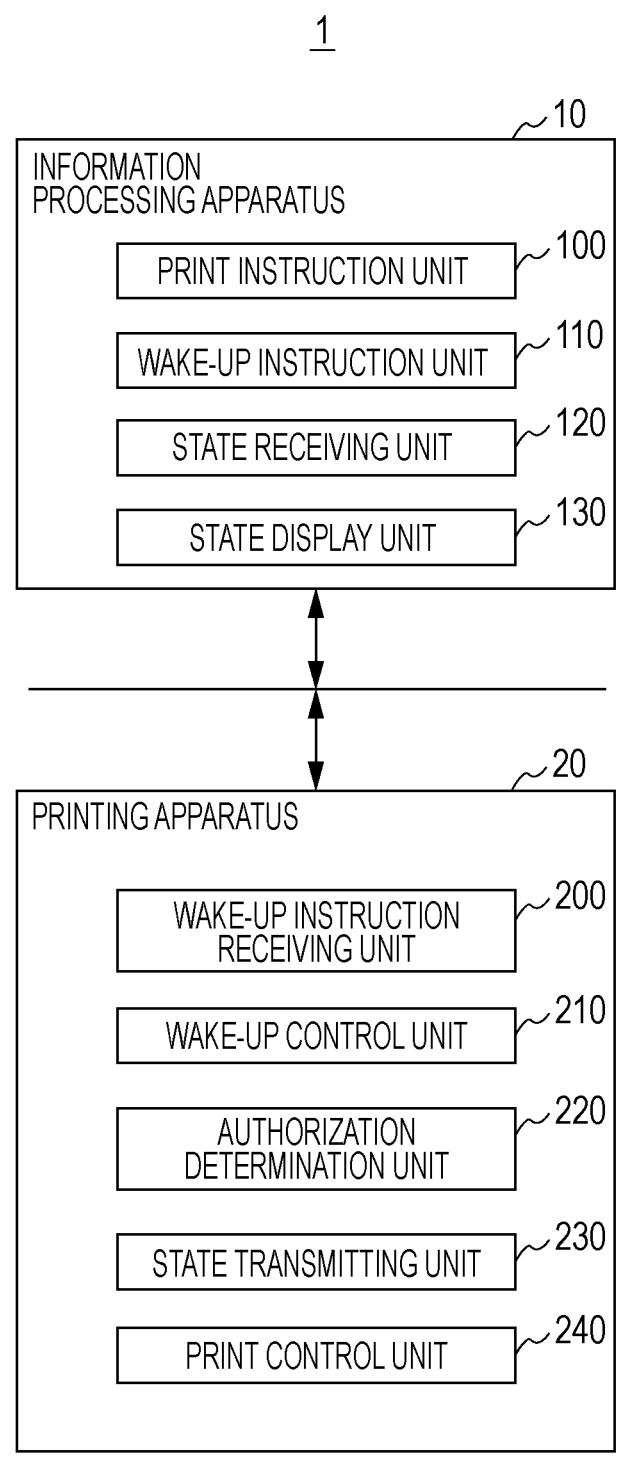
FIG. 3 is a view illustrating one example of a functional configuration of the printing system.

FIG. 3 is a view illustrating one example of a functional configuration of the printing system.

The information processing apparatus 10 has a print instruction unit 100, a wake-up instruction unit 110, a state receiving unit 120, and a state display unit 130.

Execution by the CPU of a predetermined program loaded from the auxiliary storage device to the RAM causes these functional units to perform their respective functions. The predetermined program is stored in advance, for example, in the auxiliary storage device. Of course, the predetermined program may be downloaded via the network I/F over a network to be installed and/or updated. Furthermore, in a case where the information processing apparatus has a device that reads from a portable storage medium, the predetermined program may be read from the storage medium to be installed and/or updated.

In addition, the predetermined program may be embodied, for example, as the printer driver program. Of course, some or all of the functions may be embodied as an OS program or an application program other than the printer driver program.

The print instruction unit 100 transmits the print instruction to the printing apparatus 20. For example, when receiving the input of print start operation from the user via the input device, the print instruction unit 100 obtains the print-targeted data and the print setting, and generates the print data (print job) based on these. Then, the print instruction is transmitted to the printing apparatus 20 along with the print data.

Furthermore, for example, the print instruction unit 100 monitors a response to the print instruction from the printing apparatus 20, and determines whether or not the starting of the print is successful. Furthermore, in a case of receiving the wake-up completion notification from the printing apparatus 20, the print instruction unit 100 retransmits the print instruction when the print instruction fails to result in the print start.

The wake-up instruction unit 110 transmits the wake-up instruction to the printing apparatus 20. For example, in a case where the print start fails, the wake-up instruction unit 110 transmits the wake-up instruction to the printing apparatus 20. Furthermore, the wake-up instruction unit 110 monitors the response to the wake-up instruction from the printing apparatus 20 and determines whether or not the wake-up start is successful.

Moreover, the method and the procedure for the wake-up instruction is not a given particular limitation. For example, the wake-up instruction may be transmitted to the printing apparatus 20 as a unicast or as a broadcast. Moreover, identification information (for example, a MAC address and an IP address) on the information processing apparatus 10 that is a transmitting source, and identification information (for example, a user ID) on the user of the information processing apparatus 10 are included in the wake-up instruction. In a case where the identification information on the transmitting source is not included in the wake-up instruction, the printing apparatus 20 may be notified of the identification information on the transmitting source, for example, separately from the wake-up instruction after transmitting the wake-up instruction.

The state receiving unit 120 receives a state notification including state information indicating a state of the printing apparatus 20, which is transmitted from the printing apparatus 20. For example, after the wake-up instruction is transmitted, the state receiving unit 120 receives information indicating starting of the wake-up processing, information indicating the estimated wake-up time relating to the wake-up processing, information indicating wake-up processing completion, and the like. Furthermore, in a case where the information processing apparatus 10 (or the user of the information processing apparatus 10) is not authorized to wake up the printing apparatus 20, the state receiving unit 120 receives information indicating that the wake-up is impossible.

The state display unit 130 displays the state of the printing apparatus 20 on the display, based on the state information transmitted from the printing apparatus 20. For example, in a case where the state receiving unit 120 receives the information indication the starting of the wake-up processing and the estimated wake-up time, the state display unit 130 displays the information, indicating the starting of the wake-up processing and the estimated wake-up time (for example, x seconds), in the form of a dialog on the display. Furthermore, for example, a screen is displayed on which the estimated wake-up time is counted down (for example, every 1 second) as time passes. A rate of elapsed time to the estimated wake-up time may be displayed using a bar indicating a progress percentage.

Furthermore, for example, in a case where the state receiving unit 120 receives the information indicating that the information processing apparatus 10 (or the user of the information processing apparatus 10) is not authorized to wake up the printing apparatus 20, the state display unit 130 displays the information indicating that the wake-up is impossible due to the absence of the authorization. Furthermore, for example, in a case where the wake-up start fails, the state display unit 130 displays the information indicating that the wake-up is impossible.

The printing apparatus 20 has a wake-up instruction receiving unit 200, a wake-up control unit 210, an authorization determination unit 220, a state transmitting unit 230, and a print control unit 240.

The wake-up instruction receiving unit 200 is embodied, for example, as the network I/F 26. For example, execution by the CPU 23 of a predetermined program loaded from the ROM 25 to the RAM 24 causes the other functional units to perform their respective functions. The predetermined program is stored in advance, for example, in the ROM 25. Of course, the predetermined program may be downloaded via the network I/F 26 over a network to be installed and/or updated. Furthermore, in a case where the information processing apparatus 20 has a device that reads from a portable storage medium, the predetermined program may be read from the storage medium to be installed and/or updated.

The wake-up instruction receiving unit 200 receives the wake-up instruction transmitted from the information processing apparatus 10. For example, the wake-up instruction receiving unit 200 monitors the reception of the wake-up instruction in the power-saving mode in the printing apparatus 20. Then, in a case where the wake-up instruction is received, it is determined whether or not the identification information (for example, the MAC address and the IP address) on the main apparatus is included in the wake-up instruction. In a case where the identification information on the main apparatus is included, the wake-up control unit 210 is notified of the reception of the wake-up instruction. This notification may be realized, for example, as the interrupt signal or the like.

The wake-up control unit 210 controls the wake-up of the printing apparatus 20. For example, in a case where the notification of the reception of the wake-up instruction is received from the wake-up instruction receiving unit 200, the wake-up control unit 210 causes the authorization determination unit 220 to perform determination on the wake-up authorization of the information processing apparatus 10 (or the user of the information processing apparatus 10) that is the transmitting source of the wake-up instruction.

In a case where the wake-up authorization is not present, the wake-up control unit 210 causes the state transmitting unit 230 to transmit a notification that the wake-up is impossible, to the information processing apparatus 10 that is the transmitting source of the wake-up instruction. In a case where the wake-up authorization is present, the wake-up control unit 210 starts the wake-up processing, and causes the state transmitting unit 230 to transmit the information indicating the state of the printing apparatus 20 to the information processing apparatus 10 that is the transmitting source of the wake-up instruction.

According to the present embodiment, the processing by the wake-up control unit 210, the processing by the authorization determination unit 220 and the processing by the processing the state transmitting unit 230, all of which are performed before starting the wake-up processing, are realized, for example, by the CPU 23. Therefore, in a case where the wake-up instruction addressed to the main apparatus is received by the network I/F 26 (the wake-up instruction receiving unit 200), at least the SoC 22 is turned on to operate.

When the wake-up processing is started, the wake-up control unit 210 controls the wake-up of the device (parts of the controller 21, the print engine 27, the operational panel 28 and the like) that is in a power-off state or in a sleep state in the power-saving mode. Then, the printing apparatus 20 is returned from the power-saving mode back (restoration) to the normal mode.

The authorization determination unit 220 determines whether or not the apparatus (or the user of the apparatus), which is the transmitting source of the wake-up instruction, has the wake-up authorization. For example, the authorization determination unit 220 has a table in which the information indicating the presence or the absence of the authority is mapped onto each identification information (for example, the MAC address, the IP address, the user ID and the like) on the information processing apparatus 10 (or the user of the information processing apparatus 10). Then, by referring to this table, it is determined whether or not the information processing apparatus 10 (or the user of the information processing apparatus 10), which is the transmitting source of the wake-up instruction, has the wake-up authorization. Moreover, for example, a setting of this table may be changed, for example, by the operation of the information processing apparatus 10, the operation of the operational panel 28 of the printing apparatus 20 and the like.

The state transmitting unit 230 transmits the state notification including the state information indicating the state of the printing apparatus 20. For example, when the wake-up authorization is not present, the state transmitting unit 230 transmits the information indicating that the wake-up is impossible, the information processing apparatus 10, which is the transmitting source of the wake-up instruction. On the other hand, in a case where the wake-up authority is present, the information indicating that the wake-up processing is started, and the estimated wake-up time relating to the wake-up processing are transmitted to the information processing apparatus 10 that is the transmitting source of the wake-up instruction. Furthermore, in a case where the wake-up processing is completed, the information indicating that the wake-up processing is completed is transmitted to the information processing apparatus 10, which is the transmitting source of the wake-up instruction.

At this point, the state transmitting unit 230 may transmit the estimated wake-up time that is fixed in advance, and may compute the estimated wake-up time by going through a predetermined procedure and thus transmit the computed estimated wake-up time. In a case where the estimated wake-up time is computed, the state transmitting unit 230 may detect, for example, a temperature of the print engine 27 and use a predetermined formula in which the wake-up time varies depending on the temperature. When the estimated wake-up time is computed, it is possible to provide the estimated wake-up time that has higher accuracy than when it depends on the state of the printing apparatus 20. On the other hand, when a fixed estimated wake-up time is transmitted, it is possible to provide the response of the estimated wake-up time quicker.

Moreover, the procedure and the method for transmitting the state information is not given particular limitation. For example, the state information may be transmitted to the printing apparatus 10 as the unicast or as the broadcast. In a case where the identification information (for example, the MAC address, and the IP address) on the information processing apparatus 10 may be obtained from the received wake-up instruction or the other notifications, unicast transmission may be made with respect to the information processing apparatus 10.

The print control unit 240 controls functions of the entire printing apparatus 20 in the normal mode. For example, when the print instruction including the print data and the print setting is received, the print control unit 240 generates the printing data and the control data and causes the print engine 27 to perform the printing. Furthermore, the print control unit 240 monitors the trigger (for example, the user operation, and a predetermined passage of time) that causes switching to the power-saving mode. In a case where the trigger is detected, the print control unit 240 performs control in such a manner that the normal mode is switched to the power-saving mode.

The configuration described above is classified into constituent elements according to the main processing content in order to provide an easy understanding of the configuration of the printing system 1. The method and the name used in the classification of the constituent element does not impose any limitation on the invention. The functional configuration of the printing system 1 may be classified into more constituent elements according to the processing content. Furthermore, one constituent element may be classified in such a manner to perform more processing operations. Furthermore, the processing by each constituent element may be performed with one hardware item, and may be performed with multiple hardware items.

Figure 4:
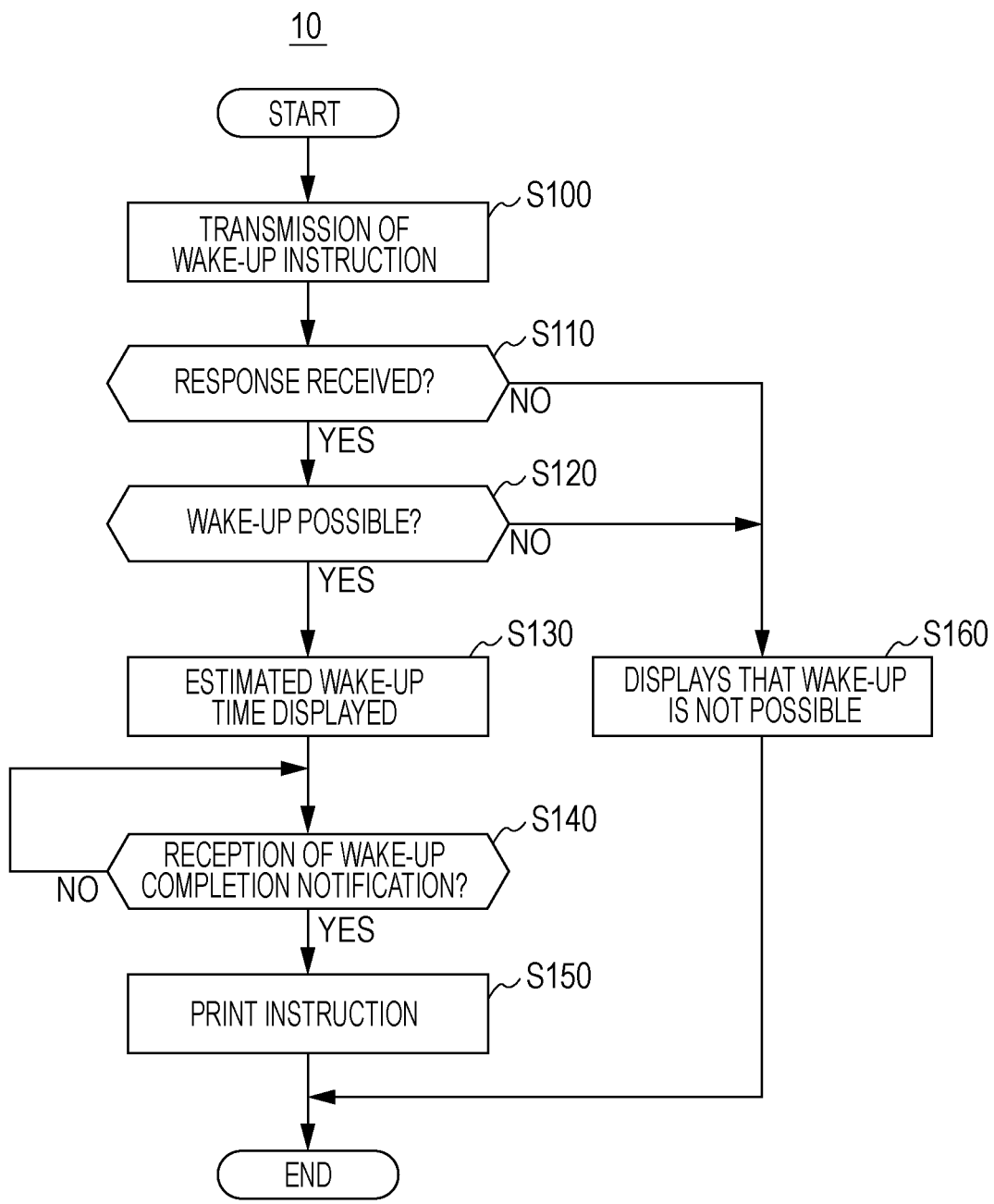
FIG. 4 is a flow chart illustrating one example of wake-up instruction processing by an information processing apparatus.

FIG. 4 is a flow chart illustrating one example of the wake-up instruction processing by the information processing apparatus. The present flow chart starts, for example, in a case where the print instruction fails. Of course, the flow chart may start at any point in time, and for example, may start when the user's operation takes place.

When the present flow chart starts, the wake-up instruction unit 110 transmits the wake-up instruction to the printing apparatus 20 (S100). Subsequently, the state receiving unit 120 monitors whether or not a response is received from the printing apparatus 20 to which the wake-up instruction is addressed (S110).

Then, for example, in a case where the response is not received within a predetermined time after transmitting the wake-up instruction, the state receiving unit 120 determines that the response is not received from the printing apparatus 20 (S110: NO). On the other hand, in a case where the state information including the information indicating the starting of the wake-up processing and the estimated wake-up time, or the state information including the information indicating that the wake-up is impossible is received from the printing apparatus 20, the response is determined as received (S110: YES).

In a case where the state information is received (S110: YES), the state display unit 130 determines whether or not the state information indicates that the wake-up is possible (S120).

Figure 5:
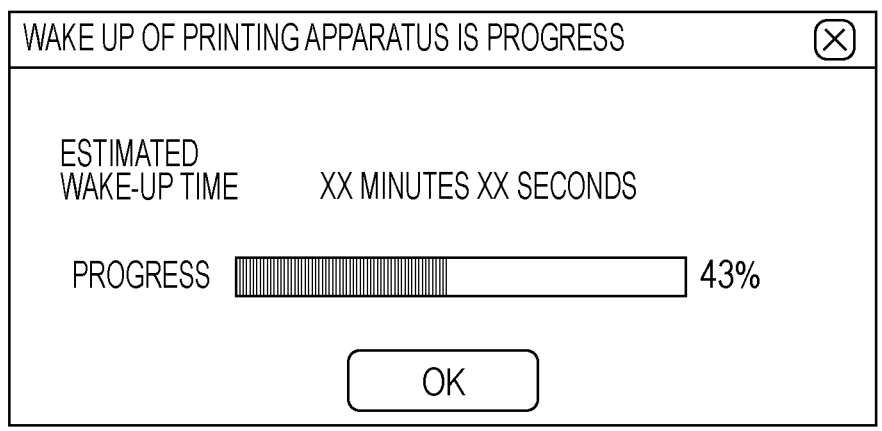
FIG. 5 is a view illustrating one example of a user interface screen in a case where the wake-up of the printing apparatus is possible.

In a case where the wake-up is possible (S120: YES), the state display unit 130 displays the estimated wake-up time based on the information included in the received state information (S130). For example, a user interface screen is displayed on the display as illustrated in FIG. 5, in such a manner that it is understood from the screen that the wake-up processing is started. As illustrated in the present drawing, the state display unit 130 displays the estimated wake-up time, counting down the estimated wake-up time is counted down as time passes. Furthermore, the rate of elapsed time to the estimated wake-up time may be displayed using a bar indicating a progress percentage. Of course, an aspect of the user interface screen is not limited to this.

When the displaying of the estimated wake-up time is started as described above, the state receiving unit 120 monitors whether or not the wake-up completion notification is received from the printing apparatus 20 (S140). In a case where the wake-up completion notification is not received (S140: NO), the monitoring goes on.

In a case where the wake-up completion notification is received (S140: YES), the print instruction unit 100 retransmits the print instruction to the printing apparatus 20.

Figure 6:
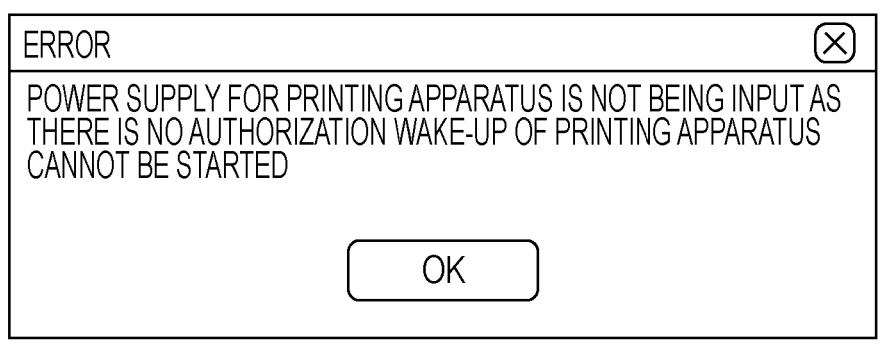
FIG. 6 is a view illustrating one example of the user interface screen in a case where the wake-up of the printing apparatus is impossible.

On the other hand, in a case where the state information is not received from the printing apparatus 20 (S110: NO), or in a case where the wake-up is impossible (S120: NO), the state display unit 130 displays the information indicating that the wake-up is impossible. For example, the user interface screen as illustrated in FIG. 6 is displayed on the display. As illustrated in the present drawing, the state display unit 130 displays a message to the effect that the wake-up is impossible because the printing apparatus 20 is powered off or the authority is not present. Of course, the aspect of the user interface screen is not limited to this.

After performing the processing in S150 or S160, the information processing apparatus 10 ends the present flow chart.

Figure 7:
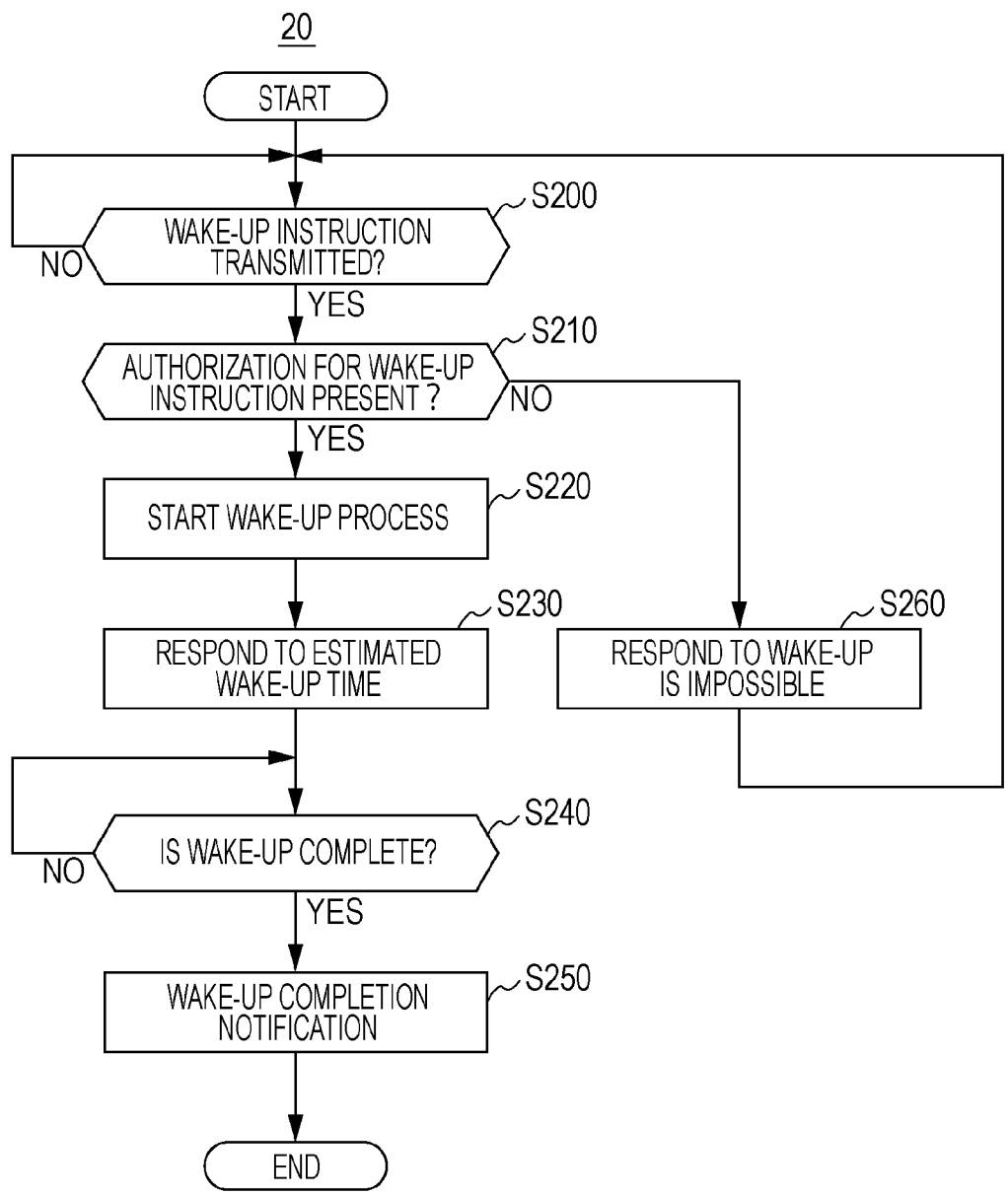
FIG. 7 is a flow chart illustrating one example of the wake-up processing on the printing apparatus.

FIG. 7 is a flow chart illustrating one example of the wake-up processing on the printing apparatus. The present flow chart starts, for example, in a case where the printing apparatus 20 is switched from the normal mode to the power-saving mode.

When the present flow chart starts, the wake-up instruction unit 200 monitors whether or not the wake-up instruction is received (S200). More specifically, the wake-up instruction receiving unit 200 monitors whether or not the wake-up instruction addressed to the main apparatus is received. In a case where the wake-up instruction is not received (S200: NO), the monitoring goes on.

In a case where the wake-up instruction is received (S200: YES), the authorization determination unit 220 determines whether or not the apparatus (or the user of the apparatus) that is the transmitting source of the wake-up instruction is addressed has the authorization (S210).

In a case where the wake-up authorization is present (S210: YES), the wake-up control unit 210 starts the wake-up processing. Then, the state transmitting unit 230 responds to the estimated wake-up time (S230). That is, the state transmitting unit 230 transmits the state information including the information indicating that the wake-up is possible and the estimated wake-up time, to the information processing apparatus 10 that is the transmitting source of the wake-up instruction.

Thereafter, the wake-up control unit 210 monitors whether or not the wake-up processing is completed (S240). In a case where the wake-up processing is not complete (S240: NO), the monitoring goes on.

In a case where the wake-up processing is completed (S240: YES), the state transmitting unit 230 transmits the wake-up completion notification to the information processing apparatus 10 that is the transmitting source of the wake-up instruction (S250).

On the other hand, in a case where the wake-up authorization is not present (S210: NO), the state transmitting unit 230 transmit the state information including the information indicating that the wake-up is impossible, to the information processing apparatus 10 that is the transmitting source of the wake-up instruction (S260). Then, the processing returns to S200.

After performing the processing in S250, the information processing apparatus 20 ends the present flow chart.

The processing unit in each of the flow charts that are described above is divided according to the main processing content in order to provide an easy understanding of the processing by the information processing apparatus 10 and the processing on the printing apparatus 20. The method and the name used in the division of the processing unit does not impose any limitation on the invention. The processing by the information processing apparatus 10 and the processing on the printing apparatus 20 may be divided into more processing units according to the processing content. Furthermore, one processing unit may be divided in such a manner to include more processing operations. Furthermore, the processing order in each flow chart described above is not limited to the illustrated example.

One example of the first embodiment of the invention is described above. According to the present embodiment, even before completing the wake-up of the network apparatus, a terminal wake-up apparatus may be made to determine that state. Then, convenience of the remote wake-up of the printing apparatus may be improved.

That is, according to the present embodiment, the printing apparatus responds with the information indicating the starting of the wake-up processing in a case where the wake-up instruction is received. With this configuration, the information processing apparatus may determine whether the wake-up processing is started, and may notify the user that the wake-up processing is started.

Furthermore, according to the present embodiment, the printing apparatus responds with the estimated wake-up time for the wake-up processing in a case where the wake-up instruction is received. With this configuration, the information processing apparatus may determine whether the wake-up processing is started, and may notify the user of the state of progress in the wake-up processing.

Furthermore, according to the present embodiment, the printing apparatus determines the presence or absence of the wake-up authorization in a case where the wake-up instruction is received, and notifies the information processing apparatus that the authorization is not present in a case where the authorization is not present. With this configuration, the printing apparatus may impose a limitation on the wake-up caused by the unauthorized user, and the information processing apparatus may notify the user that the wake-up is impossible.

Moreover, the embodiment of the invention, described above, is intended to illustrate the gist and the range of the invention, and does not limit the gist and the range of the invention. Many substitutes, many changes and many modifications are apparent to a person of ordinary skill in the art.

Modification Example 1

According to the first embodiment, in a case where the wake-up instruction addressed to the main apparatus is received by the network I/F 26 (the wake-up instruction receiving unit 200), at least SoC 22 is powered on and the CPU 23 operates, thereby performing the authorization determination, the transmitting of the state information, the wake-up processing, and the like. However, in this configuration, because the CPU 23 needs the time to wake up, it takes time for the CPU 23 to respond with the state information after receiving the wake-up instruction. Furthermore, because the CPU 23 operates even in a case where the wake-up authorization is not present, power consumption in the power-saving mode is difficult to suppress.

Figure 8:
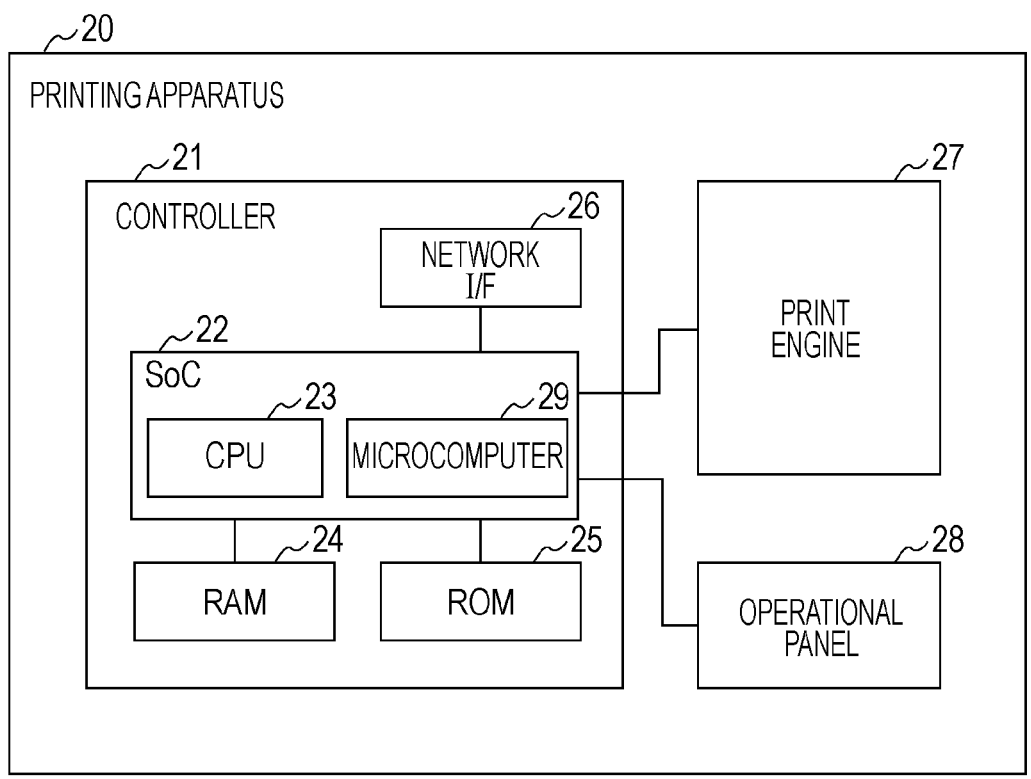
FIG. 8 is a view illustrating another example of the outlined configuration of the printing apparatus.

Then, according to a first modification example, the SoC 22 is configured as illustrated in FIG. 8. In addition to the CPU 23, the SoC 22 includes a microcomputer (referred to as a "sub CPU") that is as small as a circuit that performs only a specific processing. Moreover, the microcomputer 29 may be installed outside of the SoC 22.

For example, the microcomputer 29 operates in the power-saving mode. In a case where the network I/F 26 detects the interrupt signal, the microcomputer 29 performs the authorization determination, and generates and transmits the state information. That is, the microcomputer 29 realizes at least some of the functions of the wake-up control unit 210, the authorization determination unit 220 and the state transmitting unit 230 according to the first embodiment, without waking the CPU 23 up.

Specifically, when receiving the notification of the wake-up instruction from the network I/F 26, the microcomputer 29 determines whether or not the transmitting source of the wake-up instruction has the wake-up authorization. When the wake-up authorization is not present, the information indicating that the wake-up is impossible is transmitted to the information processing apparatus 10 that is the transmitting source of the wake-up instruction. On the other hand, in a case where the wake-up authority is present, the information indicating that the wake-up is possible, and the estimated wake-up time relating to the wake-up processing are transmitted to the information processing apparatus 10 that is the transmitting source of the wake-up instruction. Thereafter, the CPU 23 is started, and the processing on the printing apparatus 20 is started. The wake-up completion notification may be transmitted by any one of the CPU 23 and the microcomputer 29.

Moreover, for example, the table used in the authorization determination may be stored in the RAM 24 in the normal mode, and may be stored in the microcomputer 29 or a predetermined storage region inside the SoC 22 referred to by the microcomputer 29 when the normal mode is switched to the power-saving mode.

According to the modification example described above, since the CPU 23 does not need to wake up in a case where the wake-up instruction is received, the time it takes to respond with the state information may be shortened. Furthermore, since the CPU 23 does not need to wake up in a case where the wake-up authorization is not present, the power consumption may be suppressed to a low level.

Moreover, in a case where the estimated wake-up time is fixed, as illustrated above, the microcomputer 29 may transmit the information indicating that the wake-up is possible and the estimated wake-up time relating to the wake-up processing. On the one hand, in a case where the estimated wake-up time is computed, the microcomputer 29 may respond with the information indicating that the wake-up is possible, and thereafter the CPU 23 may wake up, compute the estimated wake-up time, and respond with the computed estimated wake-up time.

Other Modification Examples

For example, the information processing apparatus 10 may transmit the information designating the function of the wake-up targeted object, along with the wake-up instruction, or after issuing the wake-up instruction. Specifically, for example, a first wake-up mode in which all of the devices of the printing apparatus 20 wakes up, a second wake-up mode in which some of the devices (for example, the operational panel 28) do not wake up, and the like may be designated. Then, the printing apparatus 20 receives the information designating the function of the wake-up targeted object and performs the wake-up on the device corresponding to the designated function. In this case, the printing apparatus 20 computes, for example, the estimated wake-up time corresponding to the designated function, or may respond to the information processing apparatus 10 with a predetermined fixed time corresponding to the designated function being specified. When this is done, the user may be notified of the more accurate state of progress according to the function that has to wake up.

Furthermore, for example, the printing apparatus 20 may compute the estimated wake-up time at fixed intervals while monitoring the progress in the wake-up processing, until the wake-up is completed and may transmit the result to the information processing apparatus 10. Then, the information processing apparatus 10 perform compensation on the estimated wake-up time being displayed, using the received estimated wake-up time. When this is done, the user may be notified of the more accurate state of progress.

Furthermore, for example, the printing apparatus 20 may transmit the wake-up completion notification when in a state of being capable of performing a print job, even before the wake-up is completed. When this is done, the printing may be started earlier.

Furthermore, for example, in a case where the wake-up instruction is received from the different information processing apparatus 10 while performing the wake-up processing, the printing apparatus 20 may respond with the estimated wake-up time. With this configuration, the different information processing apparatus may determine that the wake-up processing has already been started, and may notify the user that the wake-up processing has already been started.

Moreover, the invention may be applied not only to the printing apparatus, for example, but also to a network apparatus having the power-saving mode, such as a copy machine, a multi-function printer, a scanner, and a printing apparatus.

What is claimed is:
1. A network system, comprising:
a network;
a terminal apparatus;
and a network apparatus which wakes up in a case of receiving a wake-up instruction from the terminal apparatus over the network, wherein the network apparatus includes a memory and a processor performing the functions of:
a wake-up instruction receiving unit that receives the wake-up instruction,
a wake-up control unit that performs wake-up processing in a case of receiving the wake-up instruction, and
a state transmitting unit that, in the case of receiving the wake-up instruction, transmits a state notification of the wake-up processing to the terminal apparatus while said network apparatus is not fully operational until the wake-up processing is completed, the state notification including an estimated time required for the network apparatus to complete the wake-up processing; and
wherein the terminal apparatus includes a memory and a processor performing the functions of:
a wake-up instruction transmitting unit that transmits the wake-up instruction;
a state receiving unit that receives the state notification of the wake-up processing;
a state display unit that displays a state of the wake-up processing in a case of receiving the state notification of the wake-up processing, the state of the wake-up processing including a state of progress of the wake-up processing based on the estimated time; and the network system further comprises a second terminal apparatus, wherein if the second terminal apparatus sends a second wake-up instruction to said network apparatus while said network apparatus is executing said wake-up processing, then the wake-up control unit does not perform a second wake-up processing in response to the second wake-up instruction, and the state transmitting unit does transmit the state notification of the wake-up processing being executed by the said network apparatus to the second terminal apparatus.

2. The network system according to claim 1, wherein the state transmitting unit transmits a wake-up completion notification to the terminal apparatus in a case where the wake-up processing is completed, wherein the state receiving unit receives the wake-up completion notification, and wherein the state display unit displays a state of the wake-up processing until the wake-up completion notification is received.

3. The network system according to claim 1, wherein the state notification of the wake-up processing includes information indicating starting of the wake-up processing, and wherein the state display unit displays information indicating that the wake-up processing is started.

4. The network system according to claim 1, wherein:
the terminal apparatus includes a state display unit;
in response to the terminal apparatus receiving the state notification of the wake-up processing, the display unit displays a state of the wake-up processing, including a state of progress of the wake-up processing based on an estimated time required for the network apparatus to complete the wake-up processing; and
the state transmitting unit assigns a predetermined value as the estimated time, or computes the estimated time based on a predetermined formula.

5. The network system according to claim 1, wherein:
the transmitted wake-up instruction designates a function of the network apparatus,
the wake-up control unit performs the wake-up processing on the function designated by the wake-up instruction, and
wherein the state transmitting unit transmits the state notification of the wake-up processing on the function designated by the wake-up instruction.

6. The network system according to claim 1, wherein the network apparatus includes,
an authorization determination unit that determines whether or not the terminal apparatus that is a transmitting source of the wake-up instruction has an authorization to wake up the network apparatus,
wherein the wake-up control unit does not perform the wake-up processing in a case where it is determined that the terminal apparatus does not have the authorization, and
wherein the state transmitting unit transmits a notification that wake-up is impossible, as the state notification of the wake-up processing, to the terminal apparatus, in a case where it is determined that the terminal apparatus does not have the authorization, and the state display unit displays the notification that the wake-up is impossible.

7. The network system according to claim 1, wherein the network apparatus further comprises:
a network interface;
a CPU that is a main control unit of the network apparatus; and
a microcomputer or a sub CPU that performs a specific processing relating to a response to the wake-up instruction,
wherein the network interface includes the wake-up instruction receiving unit,
wherein the CPU includes the wake-up control unit, and
wherein the microcomputer or the sub CPU includes the state transmitting unit, and transmits the state notification of the wake-up processing before starting the wake-up processing.

8. A non-transitory computer-readable storage medium that stores a program that causes a computer to function as a first terminal apparatus which transmits a wake-up instruction to a network apparatus which wakes up in a case of receiving the wake-up instruction over a network, the program causing the first terminal to execute steps comprising:
using a wake-up instruction transmitting unit to transmit the wake-up instruction to the network apparatus while the network apparatus is in a process of waking up in response to a previous wake-up instruction previously received from a second terminal apparatus;
using a state receiving unit to receive the state notification of the wake-up processing from the network apparatus while the network apparatus is not fully functional, the received state notification of the wake-up processing from the network apparatus including an estimated time required for the network apparatus to complete the wake-up processing of the previous wake-up instruction; wherein the network apparatus does not perform the second wake-up processing in response to wake-up instruction transmitted by the first terminal apparatus;
using a state display unit to display a state of the wake-up processing, the state of the wake-up processing including a state of progress of the wake-up processing based on the estimated time required for the network apparatus to complete the wake-up processing of the previous wake-up instruction, in a case of receiving the state notification of the wake-up processing; and
a print indicating section that transmits a print indication to the network apparatus that has completed the network apparatus that has completed the wake-up processing.

9. The network system according to claim 1, wherein:
the state notification transmitted by the state transmitting unit includes an estimated time required for the network apparatus to complete the wake up processing; and
the state of the wake-up processing displayed by the state display unit includes a state of progress of the wake-up processing based on the estimated time.

10. The network system according to claim 1, wherein prior to sending the wake-up instruction, the terminal apparatus transmits an operation instruction to the network apparatus for execution by the network instruction, and transmits the wake-up instruction to the network apparatus in response to the network apparatus failing to respond to the transmitted operation instruction.

11. The network system according to claim 10, wherein the network apparatus is disabled from storing the transmitted operation instruction while the network apparatus is not fully operational.

12. The network system according to claim 10, wherein:
the network apparatus transmits a wake-up completed notice in response to finishing the wake-up processing; and the terminal apparatus transmits another operation instruction to the network apparatus in response to receiving the transmitted wake-up completed notice.

13. The network system according to claim 10, wherein the network apparatus is a printer, and the operation instruction is a print instruction.

14. The network system according to claim 1, wherein:
the network apparatus wakes up from a sleep mode in the case of receiving the wake-up instruction from the terminal apparatus, the sleep mode being characterized by said network apparatus not being fully operational; and
said wake-up processing transitions said network apparatus from said sleep mode to a normal mode characterized by said network apparatus being fully operational, and said network apparatus achieves said normal mode when the wake-up processing is completed.

15. The network system according to claim 1, wherein the state transmitting unit transmits the state notification upon the wake-up control unit starting to perform wake-up processing.

16. A network system, comprising:
a network;
a first terminal apparatus;
a second terminal apparatus; and
a network apparatus that wakes up from a power-saving mode in response to receiving a first wake-up instruction from the first terminal apparatus or receiving a second wake-up instruction from the second terminal apparatus over the network, said power-saving mode being characterized by said network apparatus not being operational, wherein the network apparatus includes a memory and a processor performing the functions of:
a wake-up instruction receiving unit that receives the first wake-up instruction on said network while the network apparatus is in said power-saving mode, a wake-up control unit that performs a wake-up processing in response to receiving the first wake-up instruction, said wake-up processing transitioning said network apparatus from said power-saving mode to a normal mode characterized by said network apparatus being operational; and
a state transmitting unit that transmits a state notification indicative of an execution progress of the wake-up process to the first terminal apparatus while said network apparatus is not in said normal mode, the state notification including an estimated time required for the network apparatus to complete the wake-up processing; and
wherein the first terminal apparatus includes a memory and a processor performing the functions of:
a wake-up instruction transmitting unit that transmits the first wake-up instruction; and
a state receiving unit that receives the state notification from the network apparatus over the network; and
a state display unit that displays a state of the wake-up processing in a case of receiving the state notification of the wake-up processing, the state of the wake-up processing including a state of progress including the state of progress of the wake-up processing based on the estimated time;
wherein if the second terminal apparatus sends the second wake-up instruction to the network apparatus while the network apparatus is executing said wake-up processing, then the wake-up control unit does not perform a second wake-up processing in response to the second wake-up instruction, and the state transmitting unit starts transmitting the state notification of the wake-up processing being executed by the said network apparatus to the second terminal apparatus.

17. The network system of claim 16, wherein the state transmitting unit transmits said state notification when the wake-up control unit starts performing the wake-up process.

* * * * *